(12) United States Patent
Kim et al.

(10) Patent No.: US 7,352,880 B2
(45) Date of Patent: Apr. 1, 2008

(54) SYSTEM AND METHOD FOR DETECTING AND TRACKING A PLURALITY OF FACES IN REAL TIME BY INTEGRATING VISUAL QUES

(75) Inventors: Tae-kyun Kim, Yongin (KR); Jong-ha Lee, Hwaseong-gun (KR)

(73) Assignee: Samsung Electronics Co., Ltd., Suwon, Kyungki-Do (KR)

( * ) Notice: Subject to any disclaimer, the term of this patent is extended or adjusted under 35 U.S.C. 154(b) by 874 days.

(21) Appl. No.: 10/621,456

(22) Filed: Jul. 18, 2003

(65) Prior Publication Data

US 2004/0017930 A1    Jan. 29, 2004

(30) Foreign Application Priority Data

Jul. 19, 2002    (KR) ............... 10-2002-0042485

(51) Int. Cl.
*G06K 9/00*    (2006.01)
(52) U.S. Cl. .................................... 382/103
(58) Field of Classification Search ........ 382/103–104, 382/118; 348/169
See application file for complete search history.

(56) References Cited

U.S. PATENT DOCUMENTS

| | | | | |
|---|---|---|---|---|
| 5,034,986 A | * | 7/1991 | Karmann et al. | 382/103 |
| 6,111,517 A | * | 8/2000 | Atick et al. | 340/5.83 |
| 6,298,143 B1 | * | 10/2001 | Kikuchi et al. | 382/103 |
| 6,700,999 B1 | * | 3/2004 | Yang | 382/118 |
| 6,920,237 B2 | * | 7/2005 | Chen et al. | 382/117 |
| 6,940,545 B1 | * | 9/2005 | Ray et al. | 348/222.1 |
| 7,146,025 B2 | * | 12/2006 | Cho et al. | 382/115 |
| 7,218,759 B1 | * | 5/2007 | Ho et al. | 382/118 |

OTHER PUBLICATIONS

Sang-Yong Park et al.; "Real-time Face Detection and Tracking Using PCA"; Proceedings of the 17th Korea Information Society Spring Conference vol. 9, No. 1, pp. 717-720 (Apr. 12, 2002).
Notice to Submit Response issued by the Korean Patent Office on May 24, 2004, in corresponding patent Application No. 10-2002-0042485.

* cited by examiner

*Primary Examiner*—Brian Werner
*Assistant Examiner*—Hadi Akhavannik
(74) *Attorney, Agent, or Firm*—Buchanan Ingersoll & Rooney PC

(57) ABSTRACT

A face detection and tracking system for detecting and tracking a plurality of faces in real time from an input image comprises: a background removing unit which extracts an area having a motion by removing a background image from the input image; a candidate area extracting unit which extracts a candidate area in which a face can be located in the area having a motion by using a skin color probability map generated from a face skin color model and a global probability map a face area determination unit which extracts (ICA) features from a candidate area and determines whether the candidate area is a face area by using a trained SVM classifier; and a face area tracking unit which tracks the face area according to a directional kernel indicating a probability that a face is located in a next frame based on the skin color probability map.

19 Claims, 5 Drawing Sheets (a)　　　(b)　　　(c)　　　(d)

(a)          (b)          (c)

SYSTEM AND METHOD FOR DETECTING AND TRACKING A PLURALITY OF FACES IN REAL TIME BY INTEGRATING VISUAL QUES

This application claims priority from Korean Patent Application No. 02-42485, filed Jul. 19, 2002, the disclosure of which is incorporated herein by reference in its entirety.

BACKGROUND OF THE INVENTION

1. Field of the Invention

The present invention relates to a system and method for detecting and tracking faces, and more particularly, a face detection and tracking system and method by which a plurality of faces are detected and tracked in real time. The method for detecting a plurality of faces in real time means a method by which digital color moving pictures are input and the image coordinates and sizes of all faces appearing in an image are output in real time.

2. Description of the Related Art

In order to improve automation and monitoring performances of prior art monitoring systems, demands for a digital monitoring system, to which a real time algorithm for detecting a plurality of faces is applied, are increasing. In particular, an algorithm which can detect a variety of faces of different races having different poses and sizes appearing on an image and can operate robustly in general even under a monitoring environment having poor lighting is needed.

Meanwhile, for more effective applications, including a monitoring system, of a face detection algorithm, the most important thing is reliable detection of a face with a variety of shapes under different environments. Among the prior art methods for detecting a face, there is a method, by which whether or not a face is included in a current search window is determined through a network (or classifier) which is trained in advance, with varying the scale of the search window at all coordinates of an image, and this method has been said to provide the most reliable detection result. Also, while the size of a face appearing in an ordinary image used in a monitoring system is small, this search-window-based method has an advantage that this small-sized face can be detected by the method. As a learning classifier, a neural network or a support vector machine (hereinafter referred to as "SVM") is widely used for detection and recognition of a face.

However, since the amount of computations for the prior art methods is huge and the complexity of the computations is very high, it is impossible for a personal computer having an ordinary computation performance of the present time to detect a face in real time.

Recently, in order to satisfy both high reliability of face detection and real time implementation, research into methods for combining a variety of information from video have been extensively carried out. Among the methods, there is a method by which a face candidate area is first searched for by combining information on a distance from an image, which can be obtained by a stereo camera, and information on a skin color. Then a classifier based on a neural network is applied. However, in this method there is a hardware limitation that a stereo camera should be used and the classifier based on a neural network has a poor generality because it operates well only for an image from a trained database.

Another method uses a skin color and face pattern information at the same time. However, in this method, motion information is not used and a skin color is too sensitive to changes of illumination.

Also suggested is a method by which in order to improve the accuracy of a face detector based on the SVM, instead of using an input image as is, feature vectors are extracted from the image by independent component analysis (ICA) and are provided to the SVM such that a face is determined. However, though this method guarantees reliability by using image patterns, computations take much time because the retrieval is performed through comparison of patterns by moving the image patterns in units of pixels. Accordingly, real time implementation of this method is needed.

SUMMARY OF THE INVENTION

The present invention provides a face detection and tracking system and method, by which through effectively combining a variety of information such as information on motions of an image, skin, colors, poses of human beings, and patterns of eyes, noses, and mouths appearing in an image, detection and tracking of faces of all races having a variety of poses and sizes can be performed in real time and which can operate robustly even under a monitoring system having poor illumination.

According to an aspect of the present invention, there is provided a system comprising: a background removing unit which obtains an area which is not a background, by using the brightness difference between an input image and a background image stored in advance, then extracts an area having a color difference from the center of each area which is not the background obtained by the brightness difference, and extracts an area having a motion by removing the background image from the input image; a candidate area extracting unit which extracts a candidate area in which a face can be located in an area having a motion, by using a skin color probability map ($P_{skin}$) generated from a face skin color model; a face area determination unit which extracts independent component analysis (ICA) features from a candidate area, and by providing the ICA features to a support vector machine (SVM) which has learned features obtained by performing the ICA on learning face images and features obtained by performing the ICA on images that are not a face, determines whether or not a candidate area is a face area; and a face area tracking unit which tracks a face area according to a directional kernel indicating a probability that a face is located in a next frame based on a skin color probability map.

In the system, the candidate area extracting unit comprises: a skin color probability map generation unit which generates a skin color probability map ($P_{skin}$) of the area having a motion, by using a face skin color model; a global probability map generation unit which extracts a plurality of highest points of the area having a motion, sets central coordinates down at a predetermined distance from the plurality of highest points of the area, and calculates a probability that a face is located at any position from the central coordinates and the predetermined variance, to generate a global probability map ($P_{global}$); and a multiple scale probability map generation unit which generates a multiple scale probability map about the probability that a face is located, by multiplying the skin color probability map and the global probability map ($P_{global}$), and extracts an area, in which the probability value of the generated multiple scale probability map is equal to or greater than a predetermined threshold value, as a candidate area where a face is possibly located.

According to another aspect of the present invention, there is provided a method comprising: extracting an area having a motion by removing the background image from the input image after obtaining an area which is not a background, by using the brightness difference between an input image and a background image stored in advance, then extracting an area having a color difference from the center of each area which has a large difference of brightness; extracting a candidate area in which a face is possibly located in the area having a motion, by using a skin color probability map ($P_{skin}$) generated from a face skin color model; extracting independent component analysis (ICA) features from a candidate area and, by providing the ICA features to a support vector machine (SVM) which has learned features obtained by performing the ICA on learning face images and features obtained by performing the ICA on images that are not a face, determining whether or not the candidate area is a face area; and tracking a face area according to a directional kernel indicating a probability that a face is located in a next frame, based on the skin color probability map.

In the method, the step for extracting a candidate area comprises: generating a skin color probability map ($P_{skin}$) of the area having a motion, by using a face skin color model; extracting a plurality of highest points of the area having a motion, setting central coordinates at a predetermined distance from the plurality of highest points, and calculating a probability that a face is located at any distance from the central coordinates, to generate a global probability map ($P_{global}$); and generating a multiple scale probability map about the probability that a face is located, by multiplying the skin color probability map and the global probability map ($P_{global}$), and extracting an area, in which the probability value of the generated multiple scale probability map is equal to or greater than a predetermined threshold value, as a candidate area where a face is possibly located.

BRIEF DESCRIPTION OF THE DRAWINGS

The above and other objects and advantages of the present invention will become more apparent by describing in detail exemplary embodiments thereof with reference to the attached drawings in which.

DESCRIPTION OF THE PREFERRED EMBODIMENTS

Figure 1:
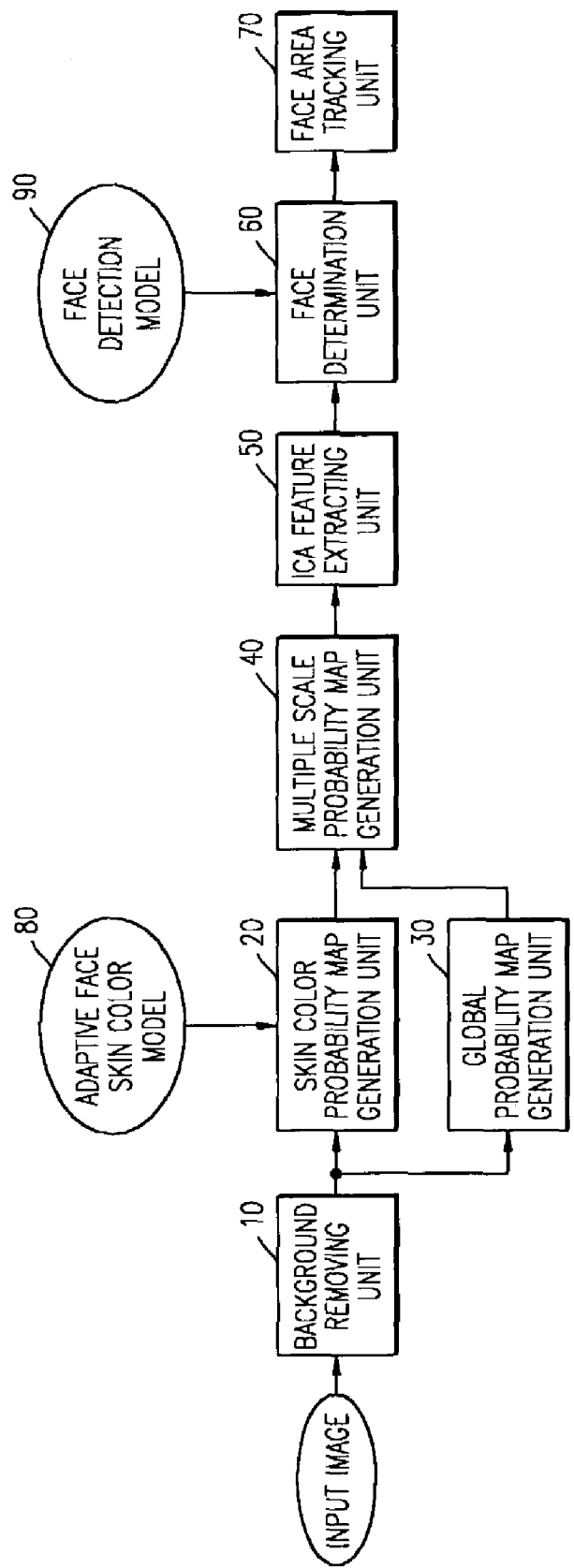
FIG. 1 is a block diagram of the structure of a system for detecting and tracking a face according to a preferred embodiment of the present invention.

FIG. 1 is a block diagram of the structure of a system according to a preferred embodiment of the present invention.

The system of the present invention comprises a background removing unit 10, a skin color probability map generation unit 20, a global probability map generation unit 30, a multiple scale probability map generation unit 40, an independent component analysis (ICA) feature extracting unit 50, a face determination unit 60, and a face area tracking unit 70. The background removing unit 10 extracts an area having a motion, by removing a background image from an input image. The skin color probability map generation unit 20 generates a skin color probability map ($P_{skin}$) on a moving area by using a face skin color model 80. The global probability map generation unit 30 extracts a plurality of highest points of the moving area, sets central coordinates at a predetermined distance from the plurality of highest points, and calculates a probability that a face is located at a position according to the distance from the central coordinates. The multiple scale probability map generation unit 40 generates a multiple scale probability map about the probability that a face is located, by multiplying a skin color probability map and a global probability map ($P_{global}$), and extracts an area, in which the probability value of the generated multiple scale probability map is equal to or greater than a predetermined threshold value, as a candidate area where a face can be located. The ICA feature extracting unit 50 extracts features by performing ICA on the extracted face candidate area. The face determination unit 60 determines whether or not the candidate area is a face, by providing the ICA features of the candidate area to a support vector machine (SVM) which, from a face detection model 90, has learned features obtained by performing the ICA on learning face images and features obtained by performing the ICA on images that are not a face. The face area tracking unit 70 tracks a face area according to a directional kernel indicating a probability that a face is located at a next frame, based on the skin color probability map.

Figure 2:
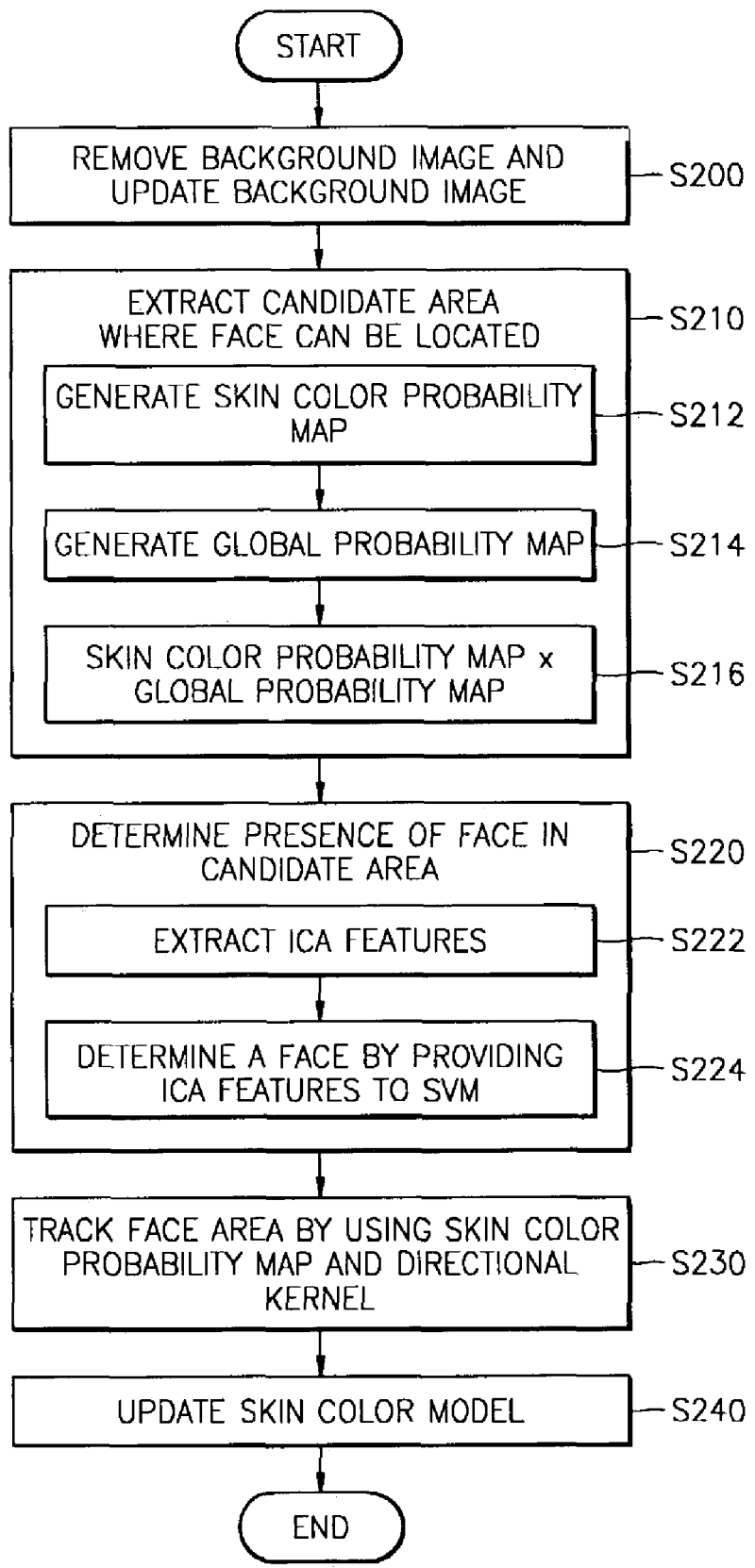
FIG. 2 is a flowchart for steps performed by a method for detecting and tracking a face according to a preferred embodiment of the present invention.

Referring further to FIG. 2, the operation process of the present invention will now be explained.

If an input image is input to the background removing unit of the system of the present invention, the background removing unit 10 detects a moving object that is not a background, by using the difference between the input image and the background image (reference image) stored in advance, and outputs an area obtained by removing the background image from the input image in step S200.

In the prior art method, if the difference in pixel brightness of the two images is equal to or greater than a fixed threshold, the pixel is defined as that of a moving area that is not a background. In this manner, all image pixels are examined such that a moving area of a current image is detected. However, this method has a problem that when the current moving object has the same brightness as that of the background, or when the brightness of the background image stored in advance changes by gradual brightness change, the background cannot be removed robustly. In addition, though an area that is not the background and obtained by using only the brightness difference is strong against noise, the probability that an area that is not the background is mistakenly recognized as the background image is high.

Accordingly, the background removing unit 10 of the present invention uses a color difference as well as the brightness difference between the images, and can remove the background image robustly against environmental changes, by automatically updating the background image gradually.

Figure 3:
FIG. 3 is diagrams showing a process for removing a background image according to a preferred embodiment of the present invention.

Referring to FIG. 3, which shows an example of a process for removing a background image according to a preferred embodiment of the present invention, the background removing unit 10 first detects an area that is not a background of FIG. 3(b) in the input image shown in FIG. 3(a), by using the brightness difference. The area that is not the background and detected by using the brightness difference is divided into several areas, and FIG. 3(b) shows an example in which the area is divided broadly into two areas.

Meanwhile, in the input image, the difference of each of R, G, B components of a pixel is calculated and then by summing up the differences, a color difference is obtained. Then, by finding an area where a color difference appears, an image in which the background image is removed is obtained as shown in FIG. 3(c).

Next, taking the center of each divided area of FIG. 3(b) as a seed, areas including the seeds in FIG. 3(c) are determined as areas that are not the background. By doing so, the background image is removed from the input image robustly against noise such that the current moving area can be extracted.

Meanwhile, if the background image is determined in the input image, the background removing unit 10 updates the background image already stored, with the determined background image.

The new background image $R'(x,y)$ is obtained as a combination of the existing background image $R(x,y)$ and a binary image $B(x,y)$ obtained by the difference from the current image, and each pixel value of the new background image is calculated by the following equation 1:

$$R'(x,y)=\beta R(x,y)+(1-\beta)B(x,y) \quad (1)$$

At this time, by updating the background image through appropriate selection of the update constant $\beta$, lighting changes can be dealt properly. The update constant is a value between 0 and 1 inclusive, and desirably, a value between 0.2 and 0.3 is selected.

The image in which the background image is removed from the input image, that is, the moving image that is not the background, is input to the skin color probability map generation unit 20 and the global probability map generation unit 30. The multiple scale probability map generation unit 40 extracts a candidate area in which a face can be located, by generating a multi-scale probability map ($P_{total}$) through multiplication of the skin color probability map generated in the skin color probability map generation unit 20 and the global probability map generated in the global probability map generation unit 30 in step S210.

Figure 4:
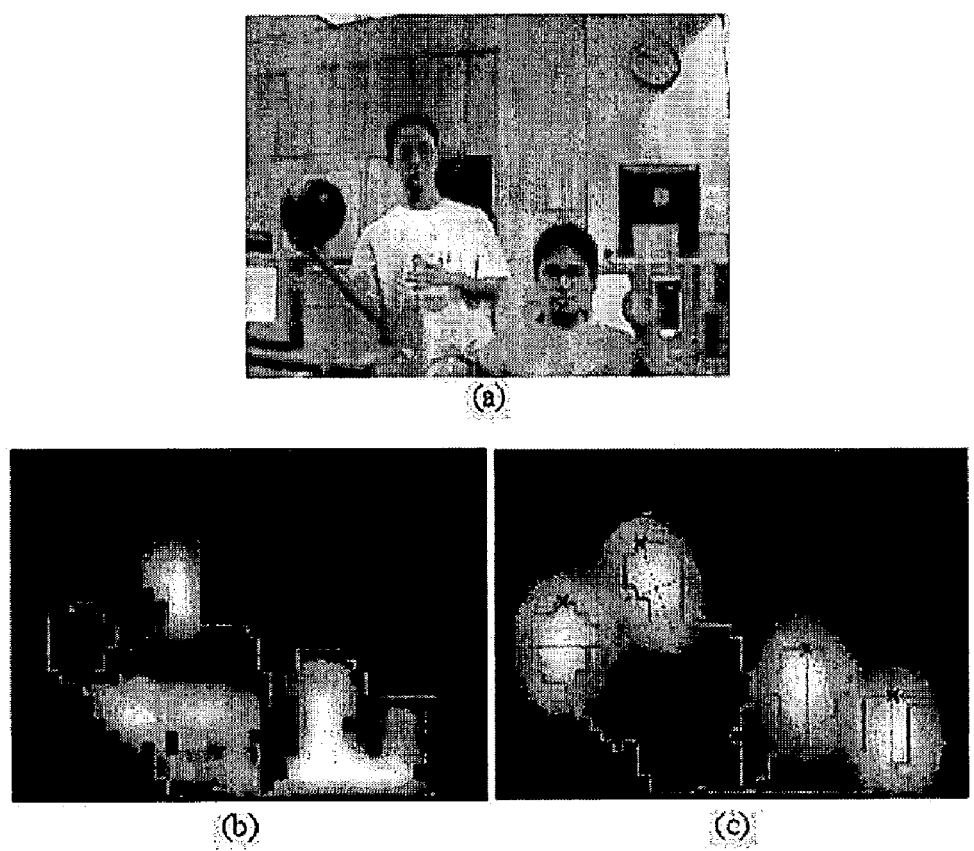
FIG. 4 is diagrams showing a skin color probability map and a global probability map according to a preferred embodiment of the present invention.

Referring to FIG. 4 showing a skin color probability map and a global probability map according to a preferred embodiment of the present invention, step S210 will now be explained in more detail. The image in which the background is removed and which is output from the background removing unit 10 is input to the skin color probability map generation unit 20. The skin color probability map generation unit 20 generates a skin color probability map ($P_{skin}$) indicating the probability that each pixel is a skin color in the input image, according to the face skin color model 80 in step S212.

The probability map generation unit 20 converts the R, G, B colors of each pixel of the input image into hue and saturation values according to the face skin color model 80, and gives a probability that each pixel color indicates a skin color, from a 2-dimensional Gaussian model which learned a variety skin colors in advance. A final probability that each pixel indicates a skin color is given as an average probability of pixels in an area of the size of a face desired to search for, and is calculated by the following equation 2:

$$P_{skin}(x, y, n) = \frac{\sum_{i=x-n/2}^{i=x+n/2}\sum_{j=y-n/2}^{j=y+n/2} g(Hue(i, j), Sat(i, j); \vec{u}, \Sigma)}{n^2} \quad (2)$$

Here, $P_{skin}(x,y,n)$ denotes the probability that when the size of a face is n, pixel (x,y) is a face skin color, Hue(i,j) and Sat(i,j) denote the hue and saturation at coordinates (i,j), respectively, and $\vec{u}$ and $\Sigma$ denote the average and distribution of Gaussian dispersion of the skin color model, respectively.

As shown in FIG. 4, when the image input to the system of the present invention is as shown in FIG. 4(a), a skin color probability map is generated as shown in FIG. 4(b). In FIG. 4(b), an area marked by solid lines indicates an area which is output from the background removing unit 10 and is not the background, and white parts inside the area indicate parts having a high probability that the part is a skin color.

A skin color 2-dimensional Gaussian model, that is, the average and distribution values of the hue and saturation of a skin color, is updated with the color of a detected face area if detection of a face is finally successful, such that the system of the present invention can robustly deal with lighting changes.

Meanwhile, the image in which the background is removed and which is output from the background removing unit 10 is also input to the global probability map generation unit 30 and a global probability map ($P_{global}$), which indicates an area having a high probability that a face is located in the input image which is not the background, is generated in step S214.

Since persons are captured as standing-pose images in an ordinary monitoring environment, there is a high probability that a face is located at the upper part of a candidate area. Reflecting this fact, more accurate and faster face detection is possible by giving a higher probability that a face is detected, to the upper part of the image in which the background is removed.

Referring to FIG. 4(c), the process for generating a global probability map will now be explained. First, highest points (Mij) marked by x are found in the image which is marked by solid lines and in which the background is removed.

From the highest points (Mij), a global probability is modeled as a Gaussian mixture, and the global probability map is generated by the following equation 3:

$$P_{global}(x, y, n) = \sum_{i=1}^{N} g(x_i, y_i; \vec{u}_i, \Sigma) \quad (3)$$

Here, n denotes the size of a face area to be detected, (x,y) denotes the coordinates of the image, i denotes the number of the highest points, $\vec{u}_i$ denotes the central coordinates of a candidate area where a face is located, and $\Sigma$ denotes a dispersion matrix. These are expressed by the following equations 4 and 5:

$$\vec{u}_i = \begin{pmatrix} u_{ix} \\ u_{iy} \end{pmatrix} = \begin{pmatrix} m_{ix} + n\cos(\angle(-\vec{n}(m_i))) \\ m_{iy} + n\sin(\angle(-\vec{n}(m_i))) \end{pmatrix}, \Sigma = \begin{pmatrix} n^2 & 1.5n^2 \\ 1.5n^2 & (1.5n)^2 \end{pmatrix} \quad (4)$$

$$\begin{pmatrix} x_i \\ y_i \end{pmatrix} = \begin{pmatrix} \cos(\angle \vec{n}(m_i)) & -\sin(\angle \vec{n}(m_i)) \\ \sin(\angle \vec{n}(m_i)) & \cos(\angle \vec{n}(m_i)) \end{pmatrix} \cdot \begin{pmatrix} x - u_{ix} \\ y - u_{iy} \end{pmatrix} \quad (5)$$

Meanwhile, for central coordinates $\vec{u}_i$ of a candidate area in which a face can be located, a vector is obtained from a highest point and a perpendicular vector perpendicular to the boundary of the segmented non-background regions in the background removing unit 10. Then, the central coordinates $\vec{u}_i$ indicate a location at a distance, which is n that is the length of a face, from the highest point in the direction of the perpendicular vector.

The generated skin color probability map and global probability map are provided to the multiple scale probability map generation unit 40.

By multiplying the skin color probability map and the global probability map, the multiple scale probability map generation unit 40 generates a multiple scale probability map ($P_{total}$) expressed as the following equation 6:

$$P_{total}(x,y,n) = P_{skin}(x,y,n) \cdot P_{global}(x,y,n) \quad (6)$$

The multiple scale probability map generation unit 40 extracts and outputs an area in which the probability value of the generated probability map is equal to or greater than a predetermined value, as a candidate area in which a face can be located. At this time, the predetermined value is determined as a threshold and is set as a value with which the value of $P_{total}$ of the equation 4 is 0.1 or more in step S216.

Then, the detected face candidate area is provided to the ICA feature extracting unit 50, which then extracts ICA feature vector from the input face candidate area in step S222.

Next, the ICA feature extracting unit 50 outputs the ICA features extracted from the face candidate area of the input image, to the face determination unit 60. The face determination unit 60 provides the ICA features to the SVM and, according to the face detection model 90, determines whether or not the extracted face candidate area is a face in step S224.

Meanwhile, the SVM, which is used for determining a face by the face determination unit 60, collects normalized face images as a learning database (DB), and obtains basis vectors that can best express face areas, by performing ICA for the collected images. ICA features mean the coefficients obtained by correlation operations of the current image and the obtained basis vectors.

That is, the face determination unit 60 trains the SVM in advance by using the ICA features of these learning face images and the ICA features of images that are not a face, and by providing the currently extracted ICA features to the trained SVM, determines whether or not the area is a face.

Then, the face determination unit 60 provides the image of the area which is determined as a face, to the face area tracking unit 70.

The face area tracking unit 70, which received the image determined as a face from the face determination unit 60, tracks a face area by using the skin color probability map and the direction kernel described above in step S230. The face area tracking unit 70 begins tracking from the central location and the size of the detected face area, and continuously updates the central location and size (dispersion) of the face through the skin color probability map ($P_{skin}$) of a next image and Kalman kernel. The update method will now be explained in more detail.

Figure 5:
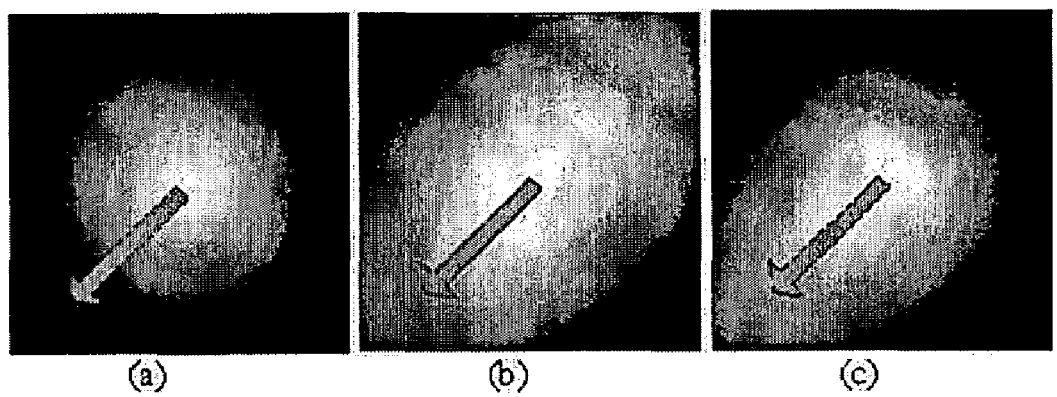
FIG. 5 is diagrams showing a directional kernel according to a preferred embodiment of the present invention.

Referring to FIG. 5, g( ) denotes the 2-dimensional Gaussian kernel as shown in FIG. 5(a), and the central location ($\mu_x$, $\mu_y$) and dispersion of the face are calculated by the following equations 7 through 9:

$$S = \sum_{i,j} P_{skin}(i,j) \cdot g(i,j;u,\Sigma) \quad (7)$$

$$\mu_x = \frac{1}{S} \sum_{i,j} P_{skin}(i,j) \cdot i \cdot g(i,j;u,\Sigma) \quad (8)$$

$$\mu_y = \frac{1}{S} \sum_{i,j} P_{skin}(i,j) \cdot j \cdot g(i,j;u,\Sigma)$$

$$\sigma_x^2 = \frac{1}{S} \sum_{i,j} P_{skin}(i,j) \cdot (i-\mu_x)^2 \cdot g(i,j;u,\Sigma) \quad (9)$$

$$\sigma_y^2 = \frac{1}{S} \sum_{i,j} P_{skin}(i,j) \cdot (j-\mu_y)^2 \cdot g(i,j;u,\Sigma)$$

$$\sigma_{xy}^2 = \frac{1}{S} \sum_{i,j} P_{skin}(i,j) \cdot (i-\mu_x) \cdot (j-\mu_y) \cdot g(i,j;u,\Sigma)$$

However, since it is difficult to track a fast-moving object with a fixed Gaussian kernel g( ), the dispersion of the kernel needs to be adjusted with respect to the speed of the moving object. A Gaussian kernel, in which the size of a motion vector is measured and the dispersion is modified so as to be in proportion to the motion vector, is shown in FIG. 5(b).

However, the kernel shown in FIG. 5(b) is symmetric in the direction of the motion vector so that it gives a high probability to the part that is in the opposite direction of the motion vector, and the part that is not in the direction of the motion vector may work as noise to another kernel tracking a face area. Accordingly, in a preferred embodiment of the present invention, in order to minimize interference between different kernels and to track a fast-moving object, a kernel having directivity is used for tracking a face area.

Referring to FIG. 5(c), the directional kernel will now be explained.

It is assumed that the coordinates, at which the center of a face is to be located, and the dispersion are ($\mu_x$, $\mu_y$) and ($\sigma_x$, $\sigma_y$), respectively. Also, when $$\bar{\sigma}_x^2 = 2(\sigma_x^2 + \Delta\mu_x^2), \bar{\sigma}_y^2 = 2(\sigma_y^2 + \Delta\mu_y^2), Z_x = \frac{x-\mu_x}{\sigma_x}, Z_y = \frac{x-\mu_y}{\sigma_y},$$

the probability that a face is located is expressed by the following equation 10:

$$f(x, y, \sigma_x, \sigma_y) = \frac{1}{S} \cdot \exp\left\{\frac{-(Z_x^2 - 2\sigma_{xy}Z_xZ_y + Z_y^2)}{2(1-\sigma_{xy}^2)}\right\} \quad (10)$$

The direction kernel is expressed as $f(x,y,\sigma_x,\sigma_y)$ in the direction in which the face area moves, and expressed as $f(x,y,\overline{\sigma}_x,\overline{\sigma}_y)$ in the opposite direction. Thus constructed directional kernel is biased toward the motion vector direction as shown in FIG. 5(c). The face area tracking unit 70 can track the detected face area in the next frame by using this directional kernel.

While tracking the face area in the next frame as described above, the face area tracking unit can also update an adaptive face skin color model 80 from the color distribution of the face area which is being tracked in step S240. The updated skin color model 80 is reused for generation of a skin color probability map needed in finding a face candidate area, and for tracking.

In order to test the method described above, 7,000 640× 480 size still images were obtained from a variety of video sequences and stored as a database. Using a 1 GHz Pentium PC having a performance time of 250 ms, detection and tracking of a plurality of faces using the stored images were performed.

TABLE 1

|  | Detect Rate | False Alarm |
| --- | --- | --- |
| Face candidate | 97.66% | N/A |
| Face pattern | 93.42% | 7 |

As shown in the table 1, the result of the test showed that the probability that a face candidate area is detected was 97.66%, the probability that a face pattern is detected was 93.42%, and the final face detection rate was 91.2%.

The frequency of detections in which an area which is not a face candidate area was detected as a face candidate area was not counted, but the frequency of detections in which an area which is not a face pattern was recognized as a face pattern was 7.

Figure 6:
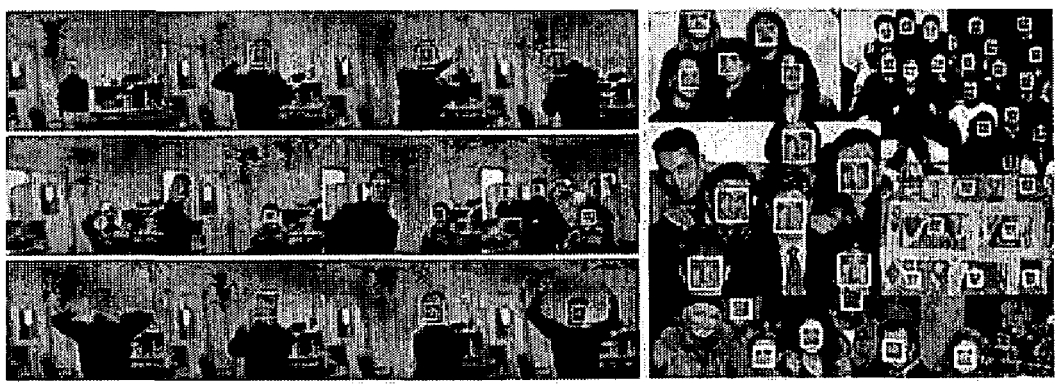
FIG. 6 is diagrams showing examples of face detection according to a preferred embodiment of the present invention.

FIG. 6 is diagrams showing an example of detecting a plurality of faces according to the method described above.

Figure 7:
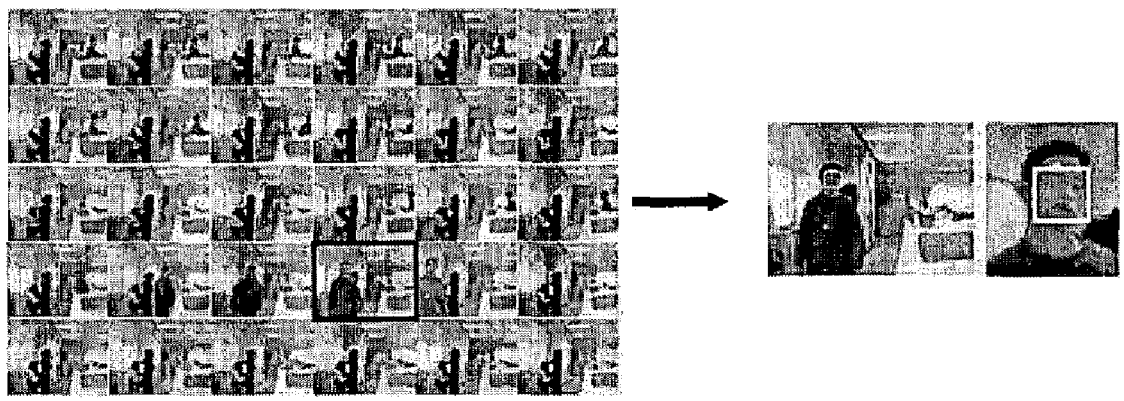
FIG. 7 is diagrams showing face examples of face detection and tracking, and the difference of the amounts of stored face images.

FIG. 7 shows the difference between the amount of images stored when simple motion amounts are measured by the prior art method, and the amount of images stored according to the present invention. In the prior monitoring system, whether or not the face of a person who is the object of monitoring is detected, all moving images are stored. Since an image of interest in a monitoring system is an image in which a face of an ordinary person is stored, the face detection and tracking system of the present invention stores only an image in which a human face is detected, and particularly stores an image of a face area such that the amount of storage can be greatly reduced with a similar monitoring effect.

Figure 8:
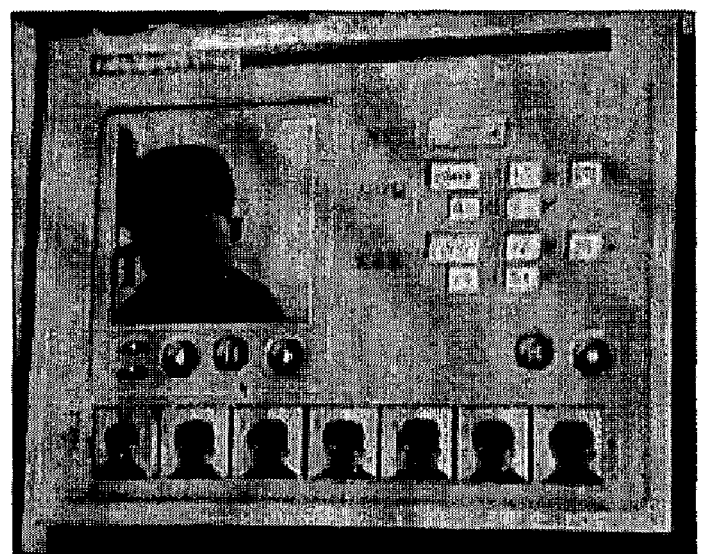
FIG. 8 is an example of retrieving a face image detected by the system of the present invention.

FIG. 8 is an example of a convenient retrieval interface mainly based on a detected face image. In the prior art method, in order to retrieve a human face, all stored images should be searched and due to the huge amount of images accumulated after monitoring for a long time, searching is a very difficult job. However, according to the present invention, only images in which a human face is detected are stored, and particularly it is possible to store only a face area. Accordingly, retrieval of a face is much more convenient and easier.

The present invention may be embodied in a code, which can be read by a computer, on a computer readable recording medium. The computer readable recording medium includes all kinds of recording apparatuses on which computer readable data are stored.

The computer readable recording media includes storage media such as magnetic storage media (e.g., ROM's, floppy disks, hard disks, etc.), optically readable media (e.g., CD-ROMs, DVDs, etc.) and carrier waves (e.g., transmissions over the Internet). Also, the computer readable recording media can be scattered on computer systems connected through a network and can store and execute a computer readable code in a distributed mode.

Optimum embodiments have been explained above and are shown. However, the present invention is not limited to the preferred embodiment described above, and it is apparent that variations and modifications by those skilled in the art can be effected within the spirit and scope of the present invention defined in the appended claims. Therefore, the scope of the present invention is not determined by the above description but by the accompanying claims.

According to the present invention, a candidate area in which a face can be located can be quickly extracted by combining a variety of information, including motion and colors, from an input image.

In particular, among extracted moving areas, higher probabilities are given to an area which is similar to a skin color and appears relatively upper part. By doing so, a candidate area in which a face can be located is found, ICA feature vectors are generated from the extracted candidate area, the feature vectors are provided to the trained SVM, and it is determined whether or not a face is in the current area such that more reliable face detection can be performed.

In addition, since tracking of the detected face is performed by using a skin color and a directional kernel, when a continuous video sequence is provided, a face candidate area in a next frame can be easily found.

Also, since the skin color model used to find a face candidate area is continuously updated with the face tracking results, lighting changes can be appropriately dealt with.

What is claimed is:

1. A face detection and tracking system for detecting and tracking a plurality of faces in real time from an input image, the system comprising:
   a background removing unit which extracts an area having a motion by removing a background image from the input image;
   a candidate area extracting unit which extracts a candidate area in which a face is possibly located in the area having a motion by using a skin color probability map ($P_{skin}$) generated from a face skin color model and a global probability map ($P_{global}$), wherein the candidate area extracting unit comprises:
      a skin color probability map generation unit which generates the skin color probability map ($P_{skin}$) of the area having a motion by using the face skin color model,
      a global probability map generation unit which extracts a plurality of highest points of the area having a motion, sets central coordinates at a predetermined distance from the plurality of highest points, and calculates a probability that a face is located within a distance from the central coordinates to generate the global probability map ($P_{global}$), and a multiple scale probability map generation unit which generates a multiple scale probability map about the probability that a face is located, by multiplying the skin color probability map ($P_{skin}$) and the global probability map ($P_{global}$), and extracts an area, in which the probability value of the generated multiple scale probability map is equal to or greater than a predetermined threshold value, as the candidate area where a face is possibly located;

a face area determination unit which extracts independent component analysis (ICA) features from the candidate area and determines whether the candidate area is a face area; and a face area tracking unit which tracks the face area according to a directional kernel indicating a probability that a face is located in a next frame based on the skin color probability map ($P_{skin}$).

2. The system of claim 1, wherein the skin color probability map generation unit converts a color of each pixel in the area having a motion into hue and saturation values, and applies the values to the face skin color model which is a 2-dimensional Gaussian model that is trained in advance with a plurality of skin colors, to generate the skin color probability map ($P_{skin}$) indicating a probability that the color of the area having a motion is one of the plurality of skin colors.

3. The system of claim 2, wherein when Hue(i,j) and Sat(i,j) denote the hue and saturation values at coordinates (i,j) of the area having a motion, respectively, $\vec{u}$ and $\Sigma$ denote average and distribution of Gaussian dispersion, respectively, and a size of a face desired to be searched for is n, the skin color probability map $P_{skin}(x,y,n)$ is generated according to the following equation:

$$P_{skin}(x, y, n) = \frac{\sum_{i=x-n/2}^{i=x+n/2} \sum_{j=y-n/2}^{j=y+n/2} g(Hue(i,j), Sat(i,j); \vec{u}, \Sigma)}{n^2}.$$

4. The system of claim 1, wherein when $\vec{u}_i$ denotes the central coordinates of the candidate area, $\Sigma$ denotes a dispersion matrix, n denotes a size of a face area, and $(x_i, y_i)$ denotes the coordinates of each local area (i), the global probability map generation unit generates the global probability map $P_{global}(x,y,n)$ according to the following equation:

$$P_{global}(x, y, n) = \sum_{i=1}^{N} g(x_i, y_i; \vec{u}_i, \Sigma)$$

where $\vec{u}_i$, $\Sigma$, $x_i$, and $y_i$ satisfies the following equations, respectively:

$$\vec{u}_i = \begin{pmatrix} u_{ix} \\ u_{iy} \end{pmatrix} = \begin{pmatrix} m_{ix} + n\cos(\angle(-\vec{n}(m_i))) \\ m_{iy} + n\sin(\angle(-\vec{n}(m_i))) \end{pmatrix}, \Sigma = \begin{pmatrix} n^2 & 1.5n^2 \\ 1.5n^2 & (1.5n)^2 \end{pmatrix}.$$

$$\begin{pmatrix} x_i \\ y_i \end{pmatrix} = \begin{pmatrix} \cos(\angle(\vec{n}(m_i))) & -\sin(\angle(\vec{n}(m_i))) \\ \sin(\angle(\vec{n}(m_i))) & \cos(\angle(\vec{n}(m_i))) \end{pmatrix} \begin{pmatrix} x - u_{ix} \\ y - u_{iy} \end{pmatrix}.$$

5. The system of claim 1, wherein the face area determination unit comprises:

an ICA feature extracting unit which extracts features by performing ICA on the extracted face candidate area; and a face determination unit which determines whether the candidate area is a face by providing the ICA features of the candidate area to a support vector machine (SVM) which has learned features obtained by performing ICA on learning face images and features obtained by performing ICA on images that are not face images.

6. A face detection and tracking system for detecting and tracking a plurality of faces in real time from an input image, the system comprising:

a background removing unit which extracts an area having a motion by removing a background image from the input image;

a candidate area extracting unit which extracts a candidate area in which a face is possibly located in the area having a motion by using a skin color probability map ($P_{skin}$) generated from a face skin color model and a global probability map ($P_{global}$);

a face area determination unit which extracts independent component analysis (ICA) features from the candidate area and determines whether the candidate area is a face area; and a face area tracking unit which tracks the face area according to a directional kernel indicating a probability that a face is located in a next frame based on the skin color probability map ($P_{skin}$), wherein when it is assumed that coordinates at which the center of a face is to be located and dispersion are ($\mu_x, \mu_y$) and ($\sigma_x, \sigma_y$), respectively, and $$\overline{\sigma}_x^2 = 2(\sigma_x^2 + \Delta\mu_x^2), \overline{\sigma}_y^2 = 2(\sigma_y^2 + \Delta\mu_y^2), Z_x = \frac{x - \mu_x}{\sigma_x}, Z_y = \frac{x - \mu_y}{\sigma_y},$$

if the probability that a face is located is $$f(x, y, \sigma_x, \sigma_y) = \frac{1}{S} \cdot \exp\left\{ \frac{-(Z_x^2 - 2\sigma_{xy}Z_xZ_y + Z_y^2)}{2(1 - \sigma_{xy}^2)} \right\},$$

the directional kernel is expressed as $f(x, y, \sigma_x, \sigma_y)$ in a direction in which the face area moves, and expressed as $f(x, y, \overline{\sigma}_x, \overline{\sigma}_y)$ in an opposite direction.

7. The system of claim 1, wherein the background removing unit obtains a first area which is not a background by using a brightness difference of the input image and a background image stored in advance, and obtains a second area which is not the background by using a color difference of the the input image and the background image stored in advance, and among a plurality of sub-areas included in the second area that is not the background, extracts each sub-area which includes the center of a sub-area included in the first area that is not the background as areas that are not the background, to remove the background image from the input image and extract an area having a motion.

8. The system of claim 7, wherein the background removing unit updates a new background image R'(x,y) according to the following equation:

$$R'(x,y) = \beta R(x,y) + (1-\beta)B(x,y)$$

where R(x,y) denotes an existing background image, B(x,y) denotes a binary image in which an area having a motion is removed from the input image, and β denotes an update constant.

9. A face detection and tracking system for detecting and tracking a plurality of faces in real time from an input image, the system comprising:
   a background removing unit which obtains a first area which is not a background by using a brightness difference of the input image and a background image stored in advance, and obtains a second area which is not the background by using a color difference of the input image and the background image stored in advance, and among a plurality of sub-areas included in the second area that is not the background, extracts each sub-area which includes the center of a sub-area included in the first area that is not the background, as areas that are not background, to remove the background image from the input image and extract an area having a motion;
   a skin color probability map generation unit which generates a skin color probability map ($P_{skin}$) of the area having a motion, by using a face skin color model;
   a global probability map generation unit which extracts a plurality of highest points of the area having a motion, sets central coordinates at a predetermined distance from the plurality of highest points, calculates a probability that a face is located within a predetermined distance from the central coordinates, to generate a global probability map ($P_{global}$);
   a multiple scale probability map generation unit which generates a multiple scale probability map about the probability that a face is located by multiplying the skin color probability map ($P_{skin}$) and the global probability map ($P_{global}$), and extracts an area, in which the probability value of the generated multiple scale probability map is equal to or greater than a predetermined threshold value, as a candidate area where a face is possibly located;
   a face area determination unit which extracts independent component analysis (ICA) features from the candidate area and determines whether the candidate area is a face area by providing the ICA features of the candidate area to a support vector machine (SVM) which has learned features obtained by performing ICA on learning face images and features obtained by performing ICA on images that are not face images; and
   a face area tracking unit which tracks a face area according to a directional kernel indicating a probability that a face is located in a next frame, based on the skin color probability map ($P_{skin}$).

10. A face detection and tracking method for detecting and tracking a plurality of faces in real time from an input image, the method comprising:
   (a) extracting an area having a motion by removing a background image from the input image;
   (b) extracting a candidate area in which a face is possibly located in the area having a motion by using a skin color probability map ($P_{skin}$) generated from a face skin color model and a global probability map ($P_{global}$), wherein step (b) comprises:
      (b1) generating the skin color probability map ($P_{skin}$) of the area having a motion by using the face skin color model;
      (b2) extracting a plurality of highest points of the area having a motion, setting central coordinates at a predetermined distance from the plurality of highest points, and calculating a probability that a face is located within a predetermined distance from the central coordinates, to generate the global probability map ($P_{global}$), and
      (b3) generating a multiple scale probability map about the probability that a face is located by multiplying the skin color probability map ($P_{skin}$) and the global probability map ($P_{global}$), and extracting an area, in which the probability value of the generated multiple scale probability map is equal to or greater than a predetermined threshold value, as the candidate area where a face is possibly located;
   (c) extracting independent component analysis (ICA) features from a candidate area and determining whether the candidate area is a face area; and
   (d) tracking the face area according to a directional kernel indicating a probability that a face is located in a next frame, based on the skin color probability map ($P_{skin}$).

11. The method of claim 10, wherein in step (b1) color of each pixel in the area having a motion is converted into hue and saturation values and the values are applied to the face skin color model, which is a 2-dimensional Gaussian model that is trained in advance with a plurality of skin colors, to generate the skin color probability map ($P_{skin}$) indicating a probability that the color of an area having a motion is one of the plurality of skin colors.

12. The method of claim 11, wherein when Hue(i,j) and Sat(i,j) denote the hue and saturation values at coordinates (i,j) of the area having a motion, respectively, $\vec{u}$ and Σ denote average and distribution of Gaussian dispersion, respectively, and a size of a face desired to be searched for is n, the skin color probability map $P_{skin}(x,y,n)$ is generated according to the following equation:

$$P_{skin}(x, y, n) = \frac{\sum_{i=x-n/2}^{i=x+n/2} \sum_{j=y-n/2}^{j=y+n/2} g(Hue(i, j), Sat(i, j); \vec{u}, \Sigma)}{n^2}.$$

13. The method of claim 10, wherein in step (b2), when $\vec{u}_i$ denotes the central coordinates of the candidate area, Σ denotes a dispersion matrix, n denotes a size of a face area, and $(x_i, y_i)$ denotes the coordinates of each local area (i), the global probability map $P_{global}(x,y,n)$ is generated according to the following equation:

$$P_{global}(x, y, n) = \sum_{i=1}^{N} g(x_i, y_i; \vec{u}_i, \Sigma)$$

where $\vec{u}_i$, Σ, $x_i$, and $y_i$ satisfy the following equations, respectively:

$$\vec{u}_i = \begin{pmatrix} u_{ix} \\ u_{iy} \end{pmatrix} = \begin{pmatrix} m_{ix} + n\cos(\angle(-\vec{n}(m_i))) \\ m_{iy} + n\sin(\angle(-\vec{n}(m_i))) \end{pmatrix}, \Sigma = \begin{pmatrix} n^2 & 1.5n^2 \\ 1.5n^2 & (1.5n)^2 \end{pmatrix}.$$

$$\begin{pmatrix} x_i \\ y_i \end{pmatrix} = \begin{pmatrix} \cos(\angle(\vec{n}(m_i))) & -\sin(\angle(\vec{n}(m_i))) \\ \sin(\angle(\vec{n}(m_i))) & \cos(\angle(\vec{n}(m_i))) \end{pmatrix} \cdot \begin{pmatrix} x - u_{ix} \\ y - u_{iy} \end{pmatrix}.$$

14. The method of claim 10, wherein step (c) comprises:
extracting features by performing ICA on the extracted face candidate area; and
determining whether the candidate area is a face by providing the ICA features of the candidate area to a support vector machine (SVM) which has learned features obtained by performing ICA on learning face images and features obtained by performing ICA on images that are not face images.

15. A face detection and tracking method for detecting and tracking a plurality of faces in real time from an input image, the method comprising:
(a) extracting an area having a motion by removing a background image from the input image;
(b) extracting a candidate area in which a face is possibly located in the area having a motion by using a skin color probability map ($P_{skin}$) generated from a face skin color model and a global probability map ($P_{global}$);
(c) extracting independent component analysis (ICA) features from a candidate area and determining whether the candidate area is a face area; and
(d) tracking the face area according to a directional kernel indicating a probability that a face is located in a next frame, based on the skin color probability map ($P_{skin}$), wherein when it is assumed that the coordinates at which the center of a face is to be located and the dispersion are ($\mu_x, \mu_y$) and ($\sigma_x, \sigma_y$) respectively, and $$\overline{\sigma}_x^2 = 2(\sigma_x^2 + \Delta\mu_x^2), \overline{\sigma}_y^2 = 2(\sigma_y^2 + \Delta\mu_y^2), Z_x = \frac{x - \mu_x}{\sigma_x}, Z_y = \frac{x - \mu_y}{\sigma_y},$$

if the probability that a face is located is $$f(x, y, \sigma_x, \sigma_y) = \frac{1}{S} \cdot \exp\left\{\frac{-(Z_x^2 - 2\sigma_{xy}Z_xZ_y + Z_y^2)}{2(1 - \sigma_{xy}^2)}\right\},$$

the directional kernel is expressed as $f(x,y, \sigma_x, \sigma_y)$ in a direction in which the face area moves, and expressed as $f(x,y, \overline{\sigma}_x, \overline{\sigma}_y)$ in an opposite direction.

16. The method of claim 10, wherein in step (a), a first area which is not a background is obtained by using a brightness difference of the input image and a background image stored in advance, and a second area which is not the background is obtained by using a color difference of the input image and a background image stored in advance, and among a plurality of sub-areas included in the second area that is not the background, each sub-area, which includes the center of a sub-area included in the first area that is not the background, is extracted as an area that is not the background, so that the background image is removed from the input image and an area having a motion is extracted.

17. The method of claim 16, wherein in step (a), a new background image R'(x,y) is updated according to the following equation:

$$R'(x,y) = \beta R(x,y) + (1-\beta) B(x,y)$$

where R(x,y) denotes an existing background image, B(x,y) denotes a binary image in which an area having a motion is removed from the input image, and β denotes an update constant.

18. A face detection and tracking method for detecting and tracking a plurality of faces in real time by combining visual information of an input image, the method comprising:
obtaining a first area which is not a background by using a brightness difference of an input image and a background image stored in advance, and obtaining a second area which is not the background by using a color difference of the input image and a background image stored in advance, and among a plurality of sub-areas included in the second area that is not the background, extracting each sub-area which includes the center of a sub-area included in the first area that is not the background, as areas that are not background, to remove the background image from the input image and extract an area having a motion;
generating a skin color probability map ($P_{skin}$) of the area having a motion by using a face skin color model;
extracting a plurality of highest points of the area having a motion, setting central coordinates at a predetermined distance from the plurality of highest points, and calculating a probability that a face is located within a predetermined distance from the central coordinates, to generate a global probability map ($P_{global}$);
generating a multiple scale probability map about the probability that a face is located by multiplying the skin color probability map ($P_{skin}$) and the global probability map ($P_{global}$), and extracting an area, in which the probability value of the generated multiple scale probability map is equal to or greater than a predetermined threshold value, as a candidate area where a face is possibly located;
extracting independent component analysis (ICA) features from the candidate area and determining whether the candidate area is a face area by providing the ICA features of the candidate area to a support vector machine (SVM) which has learned features obtained by performing ICA on learning face images and features obtained by performing ICA on images that are not face images; and
tracking a face area according to a directional kernel indicating a probability that a face is located in a next frame based on the skin color probability map.

19. A computer readable medium having embodied thereon a computer program operable to cause one or more machines to execute the method of claim 10.

* * * * *